(12) United States Patent
Tauchi et al.

(10) Patent No.: US 7,667,580 B2
(45) Date of Patent: Feb. 23, 2010

(54) VEHICLE START INHIBITION SYSTEM USING A CELL PHONE AND POSITION DETECTION

(75) Inventors: Nobutaka Tauchi, Toyoake (JP); Takashi Shimizu, Anjo (JP)

(73) Assignee: Denso Corporation, Kariya (JP)

( * ) Notice: Subject to any disclaimer, the term of this patent is extended or adjusted under 35 U.S.C. 154(b) by 343 days.

(21) Appl. No.: 11/798,514

(22) Filed: May 15, 2007

(65) Prior Publication Data
US 2007/0273489 A1   Nov. 29, 2007

(30) Foreign Application Priority Data
May 17, 2006   (JP)   ............... 2006-138121

(51) Int. Cl.
*B60R 25/10*   (2006.01)
(52) U.S. Cl. ................ 340/426.11; 340/426.1
(58) Field of Classification Search ................
340/426.11–426.34, 539.13, 426.1; 307/10.3
See application file for complete search history.

(56) References Cited

U.S. PATENT DOCUMENTS

| | | | | |
|---|---|---|---|---|
| 5,225,713 A | * | 7/1993 | Henneberry et al. | 307/10.2 |
| 5,606,306 A | * | 2/1997 | Mutoh et al. | 340/426.11 |
| 5,880,679 A | | 3/1999 | Lenart et al. | |
| 7,224,261 B2 | * | 5/2007 | Shimomura | 340/426.11 |
| 2004/0239488 A1 | * | 12/2004 | Douglass et al. | 340/426.11 |

FOREIGN PATENT DOCUMENTS

| | | |
|---|---|---|
| JP | A-2002-302014 | 10/2002 |
| JP | A-2002-302015 | 10/2002 |
| JP | A-2003-036493 | 2/2003 |

* cited by examiner

*Primary Examiner*—Jeffery Hofsass
(74) *Attorney, Agent, or Firm*—Posz Law Group, PLC

(57) ABSTRACT

A vehicle moves to and remains in an out-of-cellular coverage area for a long time period. As long as the vehicle is located within a specified range from a reference point, a time measuring unit does not start time count for forcibly operating an immobiliser provided in the vehicle.

15 Claims, 10 Drawing Sheets

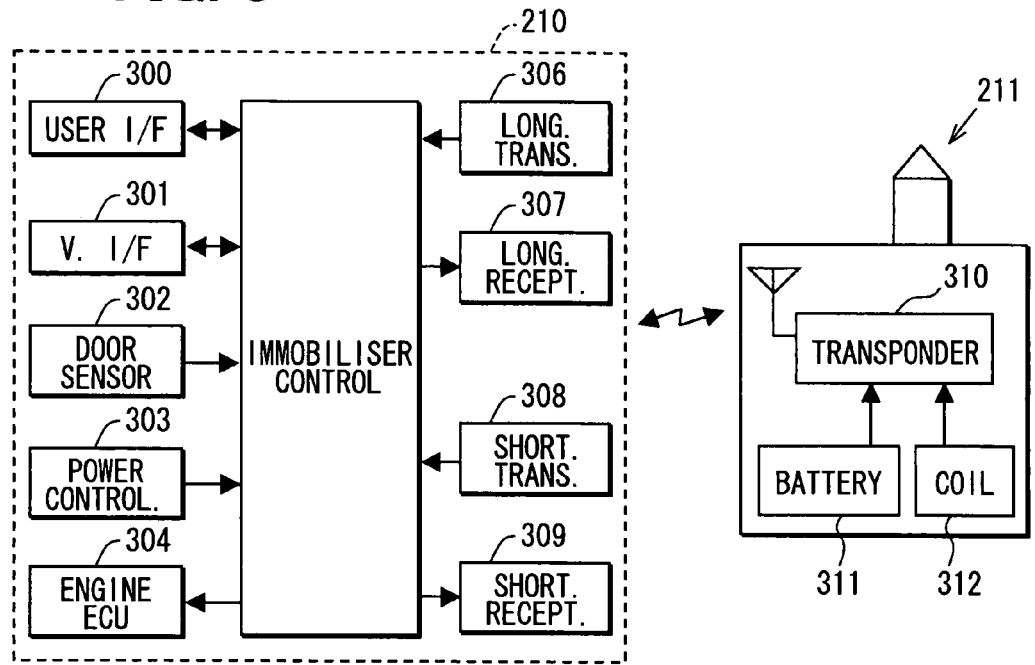
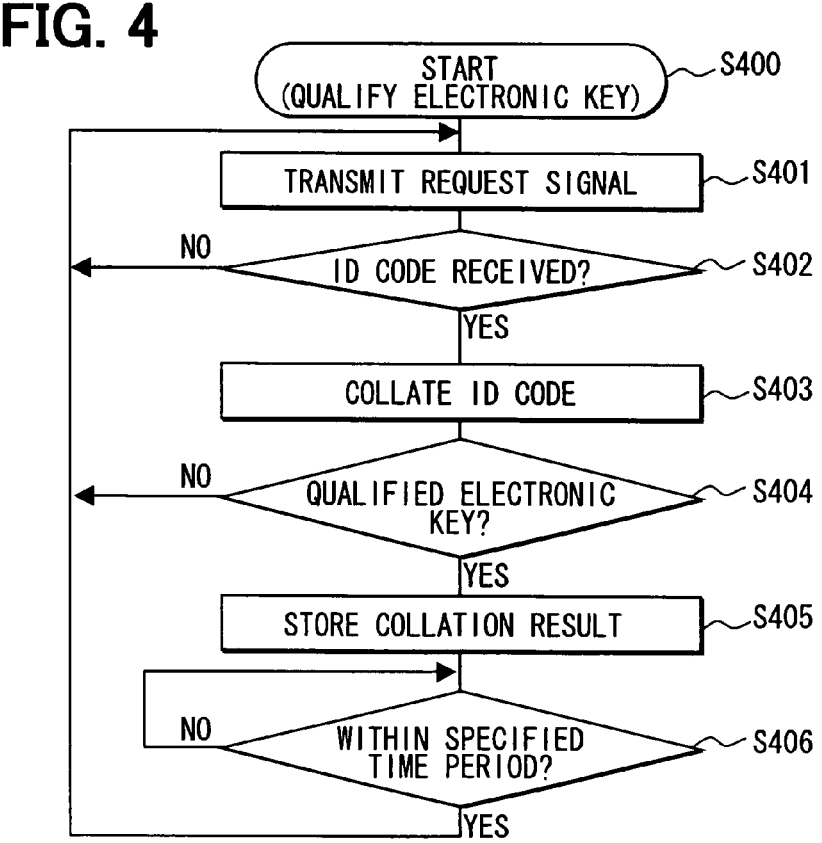

US 7,667,580 B2

VEHICLE START INHIBITION SYSTEM USING A CELL PHONE AND POSITION DETECTION

CROSS REFERENCE TO RELATED APPLICATION

This application is based on and incorporates herein by reference Japanese Patent Application No. 2006-138121 filed on May 17, 2006.

FIELD OF THE INVENTION

The present invention relates to a security system for a vehicle and an onboard security apparatus in a vehicle, both of which can be remotely controlled from outside the vehicle. More specifically, the invention relates to a method of controlling the security system and the onboard security apparatus when they cannot be remotely controlled from outside of the vehicle.

BACKGROUND OF THE INVENTION

Expensive cars and characteristically designed vehicles are always in danger of being stolen. Many cases of such theft are actually reported and cause vehicle owners to feel uneasy.

Various security apparatuses are devised as countermeasures against the theft. One example is an immobiliser (electronic lock). When the immobiliser is active, any key other than the qualified one cannot start the engine.

For example, the immobiliser is constructed as follows. A small electronic communication chip called a transponder is embedded in an engine key (in its grip) for a vehicle. An identification code (ID code) is previously recorded in the transponder. When the engine key is inserted into a key cylinder on the vehicle, the transponder's ID code is transmitted to an antenna provided for the key cylinder and is read. The read ID code is collated with an ID code that is prestored in an ECU (Electronic Control Unit). A match between these ID codes authenticates that the used engine key is the qualified one. This permits the engine to be ignited and a fuel to be injected. The immobiliser turns off.

A possible difference between the ID codes for the engine key and the vehicle inhibits the engine from being ignited and a fuel from being injected. The immobiliser remains active. The engine key cannot be used to start the engine. There has been described the general construction of the immobiliser.

As mentioned above, a qualified key can turn off the immobiliser. The immobiliser is useless when the vehicle and the qualified key are stolen together.

To solve this problem, there is proposed a remote immobiliser system that forcibly operates the immobiliser by means of a remote operation using wireless communication. The system is constructed to be able to remotely operate the immobiliser by means of the wireless communication. A remote operation from an external system can forcibly operate the immobiliser. Turning off an ignition can immobilize the vehicle. Once the vehicle becomes immobilized, the system disallows even the qualified key from operating the vehicle and can prevent thefts from increasing.

The system cannot fully function when a vehicle is out of the wireless communication service provided by the external system. The system is ineffective when the vehicle and the qualified key are stolen together and the stolen vehicle moves outside the service range.

According to a proposed technology, the remote immobiliser system measures a time period in a predetermined expiration or counts the number of operations to start a driving source. The system automatically activates the immobiliser when the vehicle is assumed to continuously stay outside the service range over the expiration or a specified threshold value for the number of start operation counts.

Specifically, such technology is described in Patent Document 1. A vehicle may move outside the range of wireless communication to interrupt a periodic, automatic communication between the vehicle and a communication center. When this state continues over the predetermined expiration, the technology disables the vehicle's driving source from starting.

Patent Document 1: JP-A-H8-268231 (U.S. Pat. No. 5,880,679)

However, a qualified user may stay long or frequently outside the service range. The technology described in the above-mentioned patent document may continuously measure the time outside the service range over the specified expiration. Even though the vehicle is not stolen, the immobiliser operates automatically. The qualified user can turn off the immobiliser by entering a password, for example. Even the qualified user may need to frequently turn off the malfunctioning immobiliser. This imposes excessive burdens on the qualified user.

SUMMARY OF THE INVENTION

The present invention has been made in consideration of the foregoing. It is therefore an object of the present invention to provide a security system such as a remote immobiliser system and an onboard security apparatus that can be remotely operated from outside the vehicle and can decrease malfunctions when a qualified user uses a vehicle during operation of the security system automatically operated after expiration of a disabled remote operation in succession.

To achieve the above object, according to an aspect of the present invention, a security system for a vehicle is provided as follows. A security apparatus is provided in the vehicle and includes a) a position detection unit for detecting a current position of the vehicle, b) a start inhibition unit for inhibiting a specified start of a driving source of the vehicle, the specified start being based on a specified operation for starting the driving source, c) a communication unit for wireless communication with a base station, d) a time measuring unit for measuring a communication-disabled time period, for which the wireless communication is disabled, and e) a control unit for controlling the start inhibition unit. A mobile phone is included for issuing an inhibition instruction for the security apparatus via the base station, wherein the control unit causes the start inhibition unit to inhibit the specified start of the driving source (i) when the inhibition instruction is received by the communication unit or (ii) when the inhibition instruction is not received and the measured communication-disabled time period becomes longer than a specified time period. The control unit causes the start inhibition unit not to inhibit the specified start when (i) a stop point, where the vehicle stops, is where the wireless communication is disabled and (ii) a current position detected by the position detection unit exists within a specified distance from the stop point.

According to another aspect of the present invention, an onboard security apparatus cooperative with a mobile phone via a base station is provided as follows. A position detection unit is included for detecting a current position of the vehicle. A start inhibition unit is included for inhibiting a specified start of a driving source of the vehicle, the specified start being based on a specified operation for starting the driving source. A communication unit is included for wireless communication with a base station to received an instruction. A time measuring unit is included for measuring a communication-disabled time period, for which the wireless communication is disabled. A control unit is included for controlling the start inhibition unit. The mobile phone is configured to issue an inhibition instruction for the security apparatus via the base station. The control unit causes the start inhibition unit to inhibit the specified start of the driving source (i) when the inhibition instruction is received by the communication unit or (ii) when the inhibition instruction is not received and the measured communication-disabled time period becomes longer than a specified time period. The control unit causes the start inhibition unit not to inhibit the specified start when (i) a stop point, where the vehicle stops, is where the wireless communication is disabled and (ii) a current position detected by the position detection unit exists within a specified distance from the stop point.

BRIEF DESCRIPTION OF THE DRAWINGS

The above and other objects, features, and advantages of the present invention will become more apparent from the following detailed description made with reference to the accompanying drawings. In the drawings:

FIG. 3 is a block diagram showing the constructions of an immobiliser and an electronic key according to the invention;

FIG. 4 is a flowchart showing a control operation of the immobiliser according to the invention;

DETAILED DESCRIPTION OF THE PREFERRED EMBODIMENTS

First Embodiment

Figure 1:
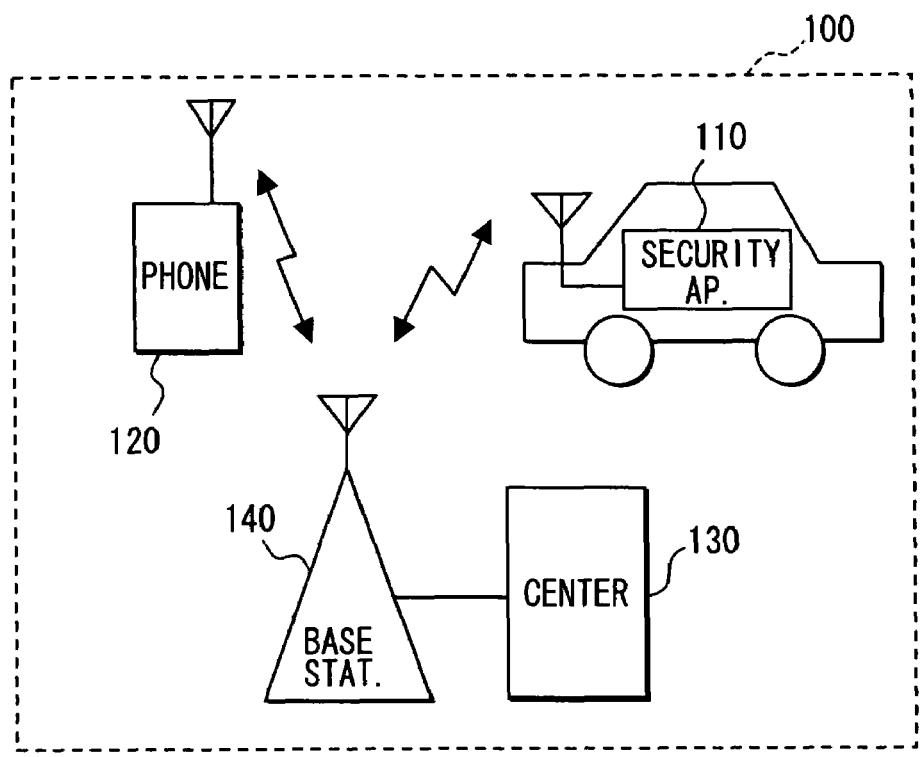
FIG. 1 is a block diagram showing the overall construction of a security system according to an embodiment.

Embodiments of the present invention will be described in further detail with reference to the accompanying drawings. FIG. 1 is a block diagram showing the construction of an embodiment. The security system 100 for a vehicle according to the embodiment broadly includes: an onboard security apparatus 110 that controls the vehicle and provides means for communication with the outside; a mobile phone 120 owned by a user; a remote service center 130 that provides a remote operation service (remote service) for remotely operating the onboard security apparatus 110 based on an instruction from the mobile phone 120; and a base station 140 that relays communication between the mobile phone 120, the onboard security apparatus 110, and the remote service center 130. The base station 140 wirelessly communicates with the mobile phone 120 and the onboard security apparatus 110 using a cellular line. The base station 140 wiredly communicates with the remote service center 130 using a leased line or the Internet.

A wireless communication system using the cellular line aims at efficiently using limited frequency bands for radio waves and avoiding interferences. The wireless communication system configures a domain (cell) corresponding to the base station 140 and forbids adjacent cells to use a radio wave with the same frequency or the same channel code. The system controls wireless output so that a radio wave transmitted from the base station 140 does not exceed an adjacent cell. In this manner, the wireless communication system using the cellular line increases the number of channels for the entire wireless network and achieves the above-mentioned object.

The onboard security apparatus 110 will be described in more detail.

Figure 2:
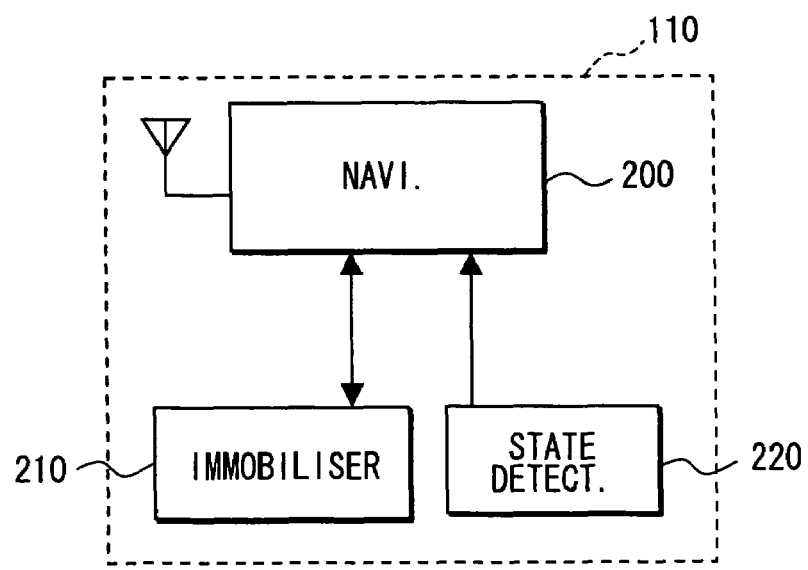
FIG. 2 is a block diagram showing the construction of an onboard security apparatus in the security system according to the invention.

The onboard security apparatus 110 is mounted on a vehicle so as to be capable of wireless communication with the base station 140. More specifically, the onboard security apparatus 110 includes an immobiliser 210, a vehicle state detection unit 220, and a navigation apparatus 200 as shown in FIG. 2. The immobiliser 210 can permit or inhibit a vehicle's driving source from starting. The vehicle state detection unit 220 detects a vehicle state. The navigation apparatus 200 forcibly operates the immobiliser or releases the forcible operation based on a signal received through the wireless communication with the base station 140 or the vehicle state detected by the vehicle state detection unit 220. These components are connected with each other through an onboard LAN (Local Area Network) that is mounted on the vehicle. The vehicle's driving source signifies an engine or a motor. The embodiment assumes the driving source to be the engine. The immobiliser 210 forcibly operates as follows. A user uses the mobile phone 120 to transmit a forcible operation instruction to the onboard security apparatus 110 (the navigation apparatus 200 according to the embodiment) via the remote service center 130 and the base station 140. Alternatively, the immobiliser 210 receives a forcible operation instruction generated from the navigation apparatus 200 based on its own determination to inhibit the engine from starting. Once the immobiliser 210 enables the forcible operation, even a qualified key cannot restart the engine (or turn off the immobiliser 210). When the immobiliser 210 enables the forcible operation while the engine is operating, the engine, when stopped, cannot restart. To release the forcible operation, the user needs to be correctly authenticated by performing authentication such as entering a specific password to the onboard security apparatus 110, for example. Alternatively, the qualified user needs to ask the remote service center 130 to release the forcible operation using the mobile phone 120 so that the onboard security apparatus 110 receives a release instruction from the remote service center 130.

When the forcible operation is not performed, the immobiliser 210 according to the embodiment performs the operation as described in "BACKGROUND OF THE INVENTION." In this case, the qualified key can release the operation as mentioned above.

The following describes in more detail the construction and operations of the immobiliser 210 with reference to FIG. 3.

The immobiliser 210 includes: a user interface unit 300 for the qualified user to release the forcible operation of the immobiliser 210; a vehicle interface unit 301 for connection with the navigation apparatus 200 by means of the onboard LAN; a door sensor 302 for detecting opening and closing of a vehicle door; a power controller 303 for changing a power supply; an engine ECU 304 for controlling the engine; a long-distance transmission unit 306 and a long-distance reception unit 307 for wireless communication with a key 211 (hereafter also referred to as an electronic key 211) owned by the user; and a short-distance transmission unit 308 and a short-distance reception unit 309 for wireless communication with the electronic key 211. These components are connected to an immobiliser control unit 305.

The electronic key 211 includes: a transponder 310 (an electronic communication chip) that stores an ID code and communicates with the immobiliser 210; a battery 311 for supplying power to the transponder 310; and a coil 312 as a safeguard against battery exhaustion.

When the battery 311 in the electronic key 211 is not exhausted, the immobiliser 210 communicates with the electronic key 211 using the long-distance transmission unit 306 and the long-distance reception unit 307. The short-distance transmission unit 308 and the short-distance reception unit 309 operate when the battery 311 is exhausted. This will be described later.

The immobiliser control unit 305 mainly includes a microcomputer. In more detail, a CPU (Central Processing Unit) connects with peripheral memory chips such as ROM (Read Only Memory) and RAM (Random Access Memory) via a bus line for data transfer.

In accordance with a program stored in the memory, the immobiliser control unit 305 outputs a control signal to the long-distance transmission unit 306 or an engine start signal to the engine ECU 304. The immobiliser control unit 305 verifies an ID code received from the electronic key 211 owned by the user.

The immobiliser control unit 305 also connects with a start switch (ignition switch), though not shown. The immobiliser control unit 305 outputs a control signal associated with an operation signal for starting or stopping the engine in accordance with the user's ignition switch operation. The immobiliser control unit 305 forcibly operates the immobiliser 210 in accordance with a forcible operation instruction received from the navigation apparatus 200 via the onboard LAN. The immobiliser control unit 305 releases the forcible operation in accordance with the collation of a password entered from the user interface unit 300 for releasing the operation.

The user interface unit 300 includes a mechanical switch group and a display unit. Even when the immobiliser 210 forcibly operates, a qualified user can enter the password on the user interface unit 300 to release the forcible operation of the immobiliser 210.

The immobiliser 210 receives the forcible operation instruction from the navigation apparatus 200 via the onboard LAN. Based on an operation signal from the ignition switch, the immobiliser 210 notifies the navigation apparatus 200 via the onboard LAN that the vehicle stops. The vehicle interface unit 301 mediates these operations.

The door sensor 302 detects the state of a latch (not shown) provided for a vehicle door to detect a signal indicating the opening or closing state of the vehicle door. The door sensor 302 assumes the door to be opened when the locked latch is released. The door sensor 302 transmits a signal indicating the door opening state to the immobiliser control unit 305. The door sensor 302 assumes the door to be closed when the released latch is locked. The door sensor 302 transmits a signal indicating the door closing state.

The power controller 303 mainly includes a microcomputer and selects a power supply to an ignition or an accessory.

The engine ECU 304 mainly includes a microcomputer and starts or stops the engine. The engine ECU 304 also connects with an ignition switch (not shown). The user's ignition switch operation outputs an operation signal indicating the engine start. The engine ECU 304 then outputs a signal indicating a request for engine start to the immobiliser control unit 305. When receiving the engine start signal from the immobiliser control unit 305, the engine ECU 304 starts the engine by controlling a starter motor and a fuel injector.

The long-distance transmission unit 306 mainly includes an RF (Radio Frequency) transmitter as well as a transmission circuit and a modulation signal circuit. The long-distance transmission unit 306 generates a transmission signal including a request signal based on the control signal from the immobiliser control unit 305. The transmission signal is supplied as a radio wave to the electronic key 211 via an antenna (not shown). The request signal requests the transponder 310 of the electronic key 211 to transmit the ID code stored in the transponder 310 to the immobiliser 210. When receiving the request signal, the transponder 310 transmits the stored ID code to the immobiliser 210.

The long-distance reception unit 307 mainly includes an RF (Radio Frequency) receiver as well as a reception circuit and a demodulation signal circuit. The long-distance reception unit 307 receives the signal containing the ID code from the electronic key 211 via the antenna (not shown) and outputs the received signal to the immobiliser control unit 305.

The short-distance transmission unit 308 enables the ID code to be transmitted to the electronic key 211 even when the battery 311 of the electronic key 211 expires. The short-distance transmission unit 308 includes an electromagnetic field generator that generates an electromagnetic field for driving the transponder 310 in the electronic key 211 based on the control signal from the immobiliser control unit 305.

When the electronic key 211 enters a propagation range (communication area) of the electromagnetic field, the electromagnetic field reaches the transponder 310 in the electronic key 211. The electromagnetic field contains the request signal. When the electronic key 211 receives the electromagnetic field, the coil 312 generates an electromotive force. The transponder 310 is energized and transmits a signal containing the ID code.

The short-distance reception unit 309 includes a reception circuit and a demodulating signal circuit. The short-distance reception unit 309 receives the signal containing the ID code from the electronic key 211 via the antenna (not shown) and outputs the received signal to the immobiliser control unit 305.

Figure 5:
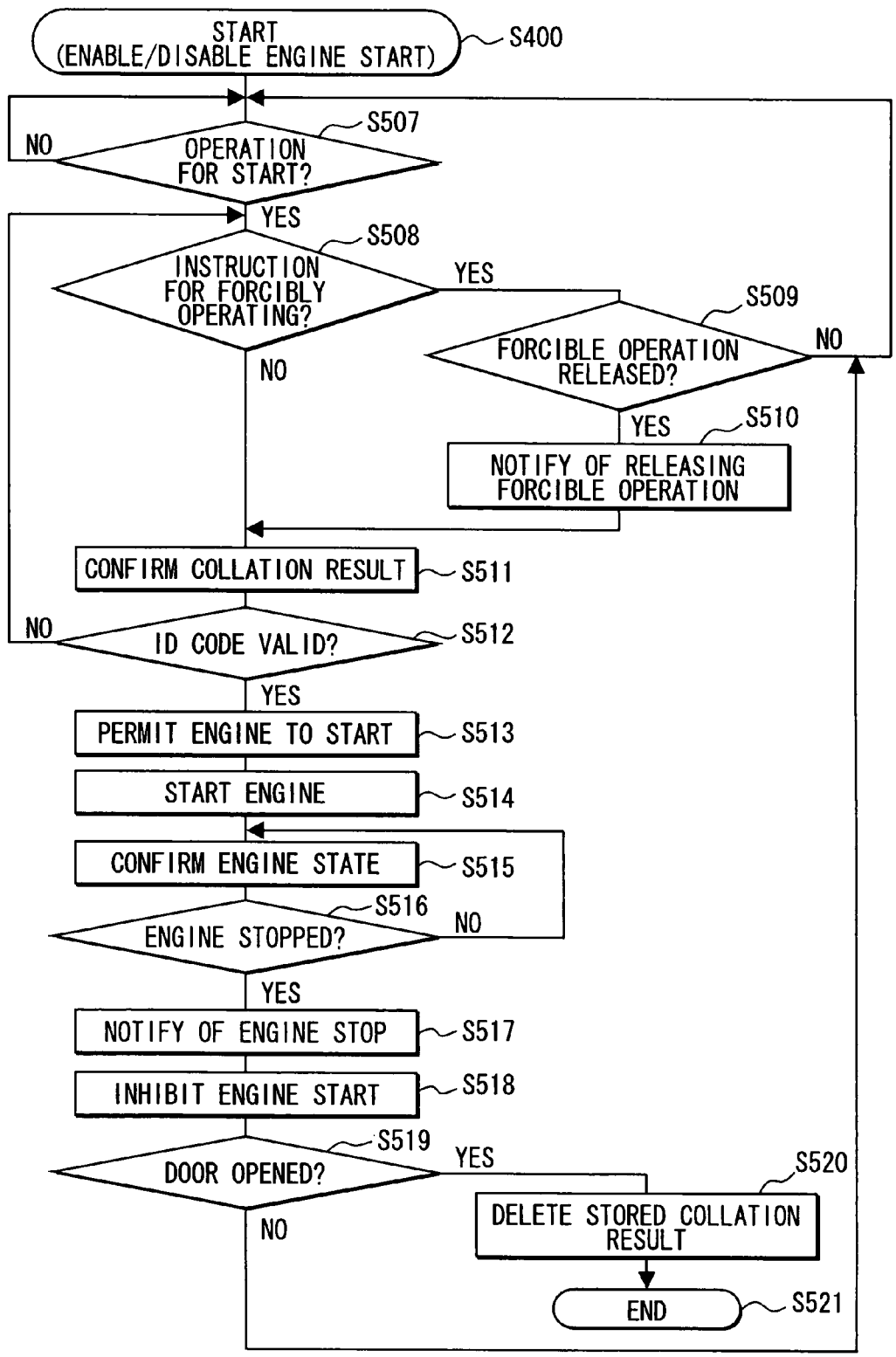
FIG. 5 is a flowchart showing a control operation of the immobiliser according to the invention.

The following describes in more detail operations of the immobiliser 210 and the immobiliser control unit 305 with reference to FIGS. 4 and 5.

FIG. 4 is a flowchart showing that the immobiliser 210 according to the embodiment of the invention determines whether or not the electronic key 211 owned by the user is qualified when the user opens the door of the stopped vehicle (with the engine stopped). FIG. 5 is a flowchart showing that the immobiliser control unit 305 according to the embodiment of the invention enables and disables the engine from starting.

The flowchart in FIG. 4 is performed at a specified time period while the immobiliser 210 is supplied with the power. The flowchart in FIG. 5 is processed parallel to the flowchart in FIG. 4.

With reference to FIG. 4, the following describes the operation in which the immobiliser 210 determines whether or not the electronic key 211 is qualified.

The flowchart in FIG. 4 starts as follows (Step S400). The door sensor 302 detects the door opened by the user and transmits a signal indicating the door opening to the immobiliser control unit 305. The immobiliser control unit 305 receives the signal.

At Step S401 as a preparatory step, the immobiliser control unit 305 determines whether there is a user owning the qualified electronic key 211 in or near the vehicle. To receive the ID code of the electronic key, the immobiliser control unit 305 allows the long-distance transmission unit 306 and the short-distance transmission unit 308 to transmit a request signal to the electronic key 211. Though not shown in the flowchart, the electronic key 211 receives the request signal and transmits the signal containing the ID code from the transponder 310 to the immobiliser 210.

At Step S402, the immobiliser control unit 305 verifies a signal from the long-distance reception unit 307 or the short-distance reception unit 309 and determines whether or not the ID code is received from the electronic key 211. When receiving the ID code from the electronic key 211 (yes at Step S402), the immobiliser control unit 305 proceeds to Step S403. When not receiving the ID code from the electronic key 211 (no at Step S402), the immobiliser control unit 305 returns to Step S401.

When receiving the ID code from the electronic key 211 at Step S402, the immobiliser control unit 305 collates the ID code at Step S403. Namely at Step S403, the immobiliser control unit 305 verifies a specified correspondence between the ID code stored in the memory and that received from the electronic key 211.

At Step S404, the immobiliser control unit 305 actually determines whether there is a user owning the qualified electronic key 211 in or near the vehicle. When the specified correspondence is maintained between the ID code stored in the memory and that received from the electronic key 211 (yes at Step S404), the immobiliser control unit 305 proceeds to Step S405, assuming that there is the user owning the qualified electronic key 211 in or near the vehicle. When the specified correspondence is not maintained between the ID code stored in the memory and that received from the electronic key 211 (no at Step S404), the immobiliser control unit 305 returns to Step S401, assuming that there is not the user owning the qualified electronic key 211 in or near the vehicle.

At Step S405, the immobiliser control unit 305 stores the collation result in the memory. The collation result indicates that there is the user owning the qualified electronic key 211 in or near the vehicle, i.e., that the ID code received from the electronic key 211 is valid. While the power is supplied, the immobiliser 210 repeats the sequence of Steps S401 through S405 each time a specified time period elapses (yes at Step S406). Within the specified time period (no at Step S406), the immobiliser 210 continues to retain the collation result.

With reference to FIG. 5, the following describes how the immobiliser control unit 305 enables and disables the engine from starting. The flowchart in FIG. 5 starts as described with reference to FIG. 4 (Step S400).

At Step S507, the immobiliser control unit 305 determines whether or not the user starts the engine, i.e., whether the user performs an operation for starting the engine. When the user starts the engine (yes at Step S507), i.e., when the ignition switch outputs an operation signal indicating the engine start, the immobiliser control unit 305 proceeds to Step S508, assuming that the engine is started. When the ignition switch does not output the operation signal indicating the engine start (no at Step S507), the immobiliser control unit 305 repeats the determination, assuming that the engine is not started.

At Step S508, the immobiliser control unit 305 determines whether or not it receives an instruction for forcibly operating the immobiliser 210 from the navigation apparatus 200 via the onboard LAN. When the instruction is received (yes at Step S508), the immobiliser control unit 305 unconditionally inhibits the engine from starting and proceeds to Step S509. When the instruction is not received (no at Step S508), the immobiliser control unit 305 proceeds to Step S511.

Step S509 releases the forcible operation of the immobiliser 210. When the operation proceeds to this step, it is a good practice, though not shown in the flowchart, to signal the authentication for releasing the forcible operation. For example, the user interface unit 300 may be used to notify the user that the immobiliser 210 enables the forcible operation. When the user enters a password using the user interface unit 300 and the password is authenticated, the forcible operation is released (yes at Step S509). Alternatively, the immobiliser control unit 305 receives an instruction for releasing the forcible operation from the navigation apparatus 200. This release instruction is issued as follows. Using the mobile phone 120, the user asks the remote service center 130 to transmit the release instruction. The remote service center 130 then transmits the release instruction to the onboard security apparatus 110. The immobiliser control unit 305 notifies the navigation apparatus 200 via the onboard LAN that the forcible operation is released (Step S510). The immobiliser control unit 305 proceeds to Step S511. When the forcible operation is not released (no at Step S509), the immobiliser control unit 305 returns to Step S507 to continue inhibiting the engine from restarting.

At Step S511, the immobiliser control unit 305 confirms the collation result stored in the memory at Step S405 in FIG. 4. At Step S512, the immobiliser control unit 305 determines whether or not the ID code is valid. When the memory stores the collation result indicating that the ID code is valid (yes at Step S512), the immobiliser control unit 305 proceeds to Step S513. When the memory does not store the collation result indicating that the ID code is valid (no at Step S512), the immobiliser control unit 305 returns to Step S508.

At Step S513, the immobiliser control unit 305 outputs the engine start signal to the engine ECU 304 for permitting the engine to start. At Step S514, the engine ECU 304 receives the signal and starts the engine by controlling the starter motor, the fuel injector, and an igniter.

At Step S515, the immobiliser control unit 305 confirms the engine state based on the power supply state controlled by the power controller 303.

At Step S516, the immobiliser control unit 305 determines whether or not the engine stops based on the confirmation at Step S515. That is, when it is determined that the power controller 303 supplies the power to the ignition and the accessory (no at Step 516), the immobiliser control unit 305 returns to Step S515, assuming that the engine is operating. When it is determined that the power controller 303 does not supply the power to the ignition and the accessory (yes at Step 516), the immobiliser control unit 305 proceeds to Step S517, assuming that the engine stops.

At Step S517, the immobiliser control unit 305 transmits a signal indicating the engine stop to the navigation apparatus 200 via the vehicle interface unit 301 and the onboard LAN.

Step S518 operates the immobiliser 210. The immobiliser control unit 305 determines that the power controller 303 supplies no power to the ignition and the accessory and that the engine stops. The immobiliser control unit 305 inhibits the engine ECU 304 from outputting the engine start signal, so as to inhibit the engine from starting.

At Step S519, the immobiliser control unit 305 confirms the door state based on a signal from the door sensor 302 to determine whether or not the user gets out of the vehicle. When the door sensor 302 does not output the signal indicating the door opening (no at Step S519), the immobiliser control unit 305 returns to Step S507, assuming that the user does not get out of the vehicle. When the door sensor 302 outputs the signal indicating the door opening (yes at Step S519), the immobiliser control unit 305 proceeds to Step S520, assuming that the user gets out of the vehicle. The immobiliser control unit 305 deletes the collation result that is stored in the memory at Step S405 and indicates validity of the ID code received from the electronic key 211. The immobiliser control unit 305 terminates the operation (Step S521).

The electronic key 211 according to the embodiment needs not be inserted into an engine key hole (not shown). The electronic key 211 automatically provides ID code authentication simultaneously with entry into a communication area for the onboard security apparatus 110 (immobiliser 210). One possible scenario is that the user starts the engine, then takes the key out of the vehicle, and the vehicle is stolen afterward. When the immobiliser 210 operates as shown in FIGS. 4 and 5, however, the immobiliser 210 and the electronic key 211 periodically collate the ID code and monitor the vehicle state. It is possible to disable the engine from restarting when the vehicle is stolen as mentioned above. Even when the immobiliser 210 forcibly operates, a qualified user can turn it off by entering a password or issuing a release instruction using the mobile phone 120 from outside.

The vehicle state detection unit 220 will now be described.

The vehicle state detection unit 220 detects an anomaly in the vehicle. For example, the vehicle state detection unit 220 detects a vibration during the vehicle stop state (with the ignition switch turned off) in the form of an abnormal signal. The vehicle interface unit (not shown) transmits the abnormal signal to the control unit via the onboard LAN. A vibration sensor or the like can be used to construct the vehicle state detection unit 220.

The navigation apparatus 200 will now be described with reference to FIGS. 6 through 10.

Figure 6:
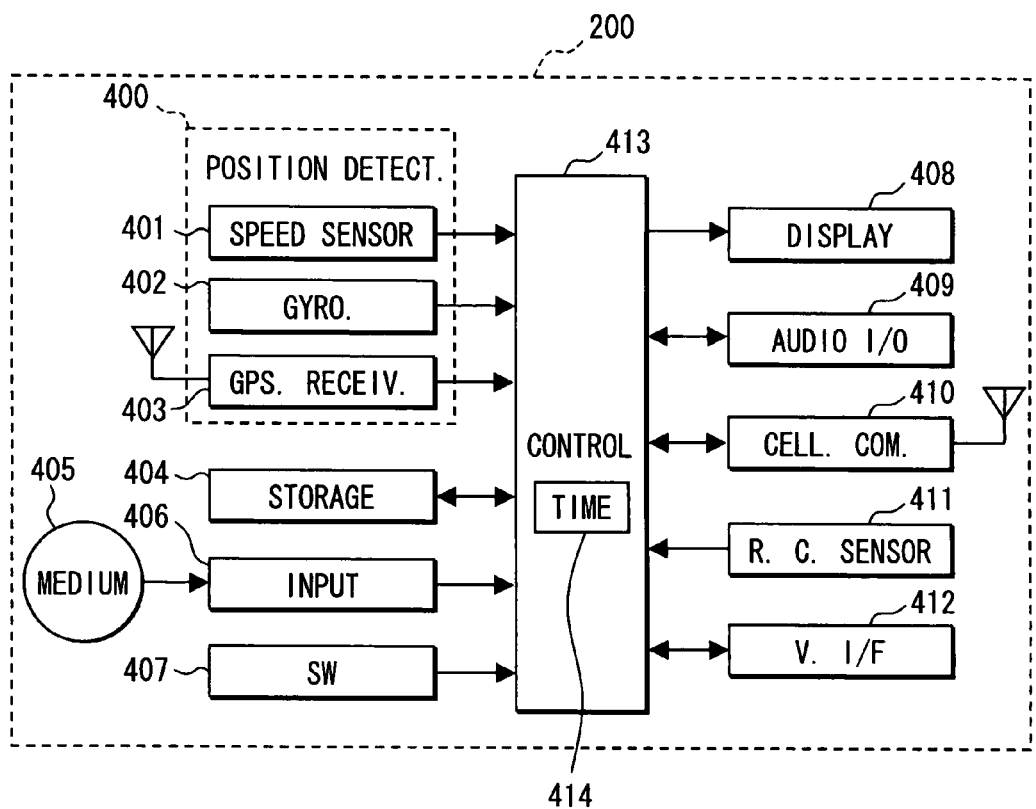
FIG. 6 is a block diagram showing the construction of a navigation apparatus according to the invention.

FIG. 6 is a block diagram showing the construction of the navigation apparatus 200. The navigation apparatus 200 includes: a position detection unit 400, a storage unit 404, a data input device 406, an operation switch group 407, a display unit 408, an audio input/output apparatus 409, a cellular communication unit 410, a remote control sensor 411, a vehicle interface unit 412, and a control unit 413. The position detection unit 400 detects the vehicle's current position information (latitude and longitude) and further includes: a vehicle speed sensor 401 that detects a vehicle speed for calculating a travel distance of the vehicle; a gyroscope 402 that detects a vehicle revolution; and a GPS (Global Positioning System) receiver 403 using an artificial satellite. The storage unit 404 uses flash memory or the like to store position information detected by the position detection unit 400. The data input device 406 reads data from a storage medium 405 such as DVD (Digital Versatile Disk) that stores map data, speech data for guidance, and speech recognition data. The operation switch group 407 is used for a user to input instructions. The display unit 408 displays a map or other information. The audio input/output apparatus 409 generates an audio for guidance or receives a user's speech instruction. The cellular communication unit 410 performs wireless communication with the base station 140 using a cellular line. The remote control sensor 411 receives a signal from a remote control terminal or a remote controller (not shown). The vehicle interface unit 412 interfaces with the vehicle state detection unit 220 and the immobiliser 210 via the onboard LAN. The control unit 413 controls these components. They are connected with each other.

The control unit 413 mainly includes a microcomputer containing a CPU and peripheral memory such as ROM and RAM and operates by reading a program stored in the memory. The control unit 413 according to the embodiment further contains a time measuring unit 414. To measure a time period, the time measuring unit 414 applies a voltage to a crystal oscillator to generate an oscillation, converts the oscillation into a cyclic electric signal, and measures the signal. The time measuring unit 414 is used as follows. The onboard security apparatus 110 may change its state from a cellular coverage state to an out-of-cellular coverage state. The cellular coverage state is capable of wireless communication with the base station 140 using a cellular line. The out-of-cellular coverage state is incapable of that wireless communication. The time measuring unit 414 measures how long the onboard security apparatus 110 keeps the out-of-cellular coverage state. Alternatively, the onboard security apparatus 110 may move from a cellular coverage area to an out-of-cellular coverage area. The cellular coverage area is capable of the wireless communication. The out-of-cellular coverage area is incapable of it. The time measuring unit 414 measures how long the onboard security apparatus 110 stays in the out-of-cellular coverage area, i.e., the time measuring unit 414 measures a communication-disabled time period with respect to the wireless communication. When the time measuring continues over a specified threshold value (i.e., when the communication-disabled time period elapses over the specified threshold value), the navigation apparatus 200 directs the immobiliser 210 to perform the forcible operation.

According to the embodiment, the storage unit 404 stores position information detected by the position detection unit 400. In addition, the storage unit 404 functions as a counter that sequentially updates and stores accumulated time counts measured by the time measuring unit 414. The memories such as the ROM and the RAM belong to the storage unit 404. The following description assumes that only the GPS receiver 403 of the navigation apparatus 200 is used to detect the position information according to the embodiment.

Figure 7:
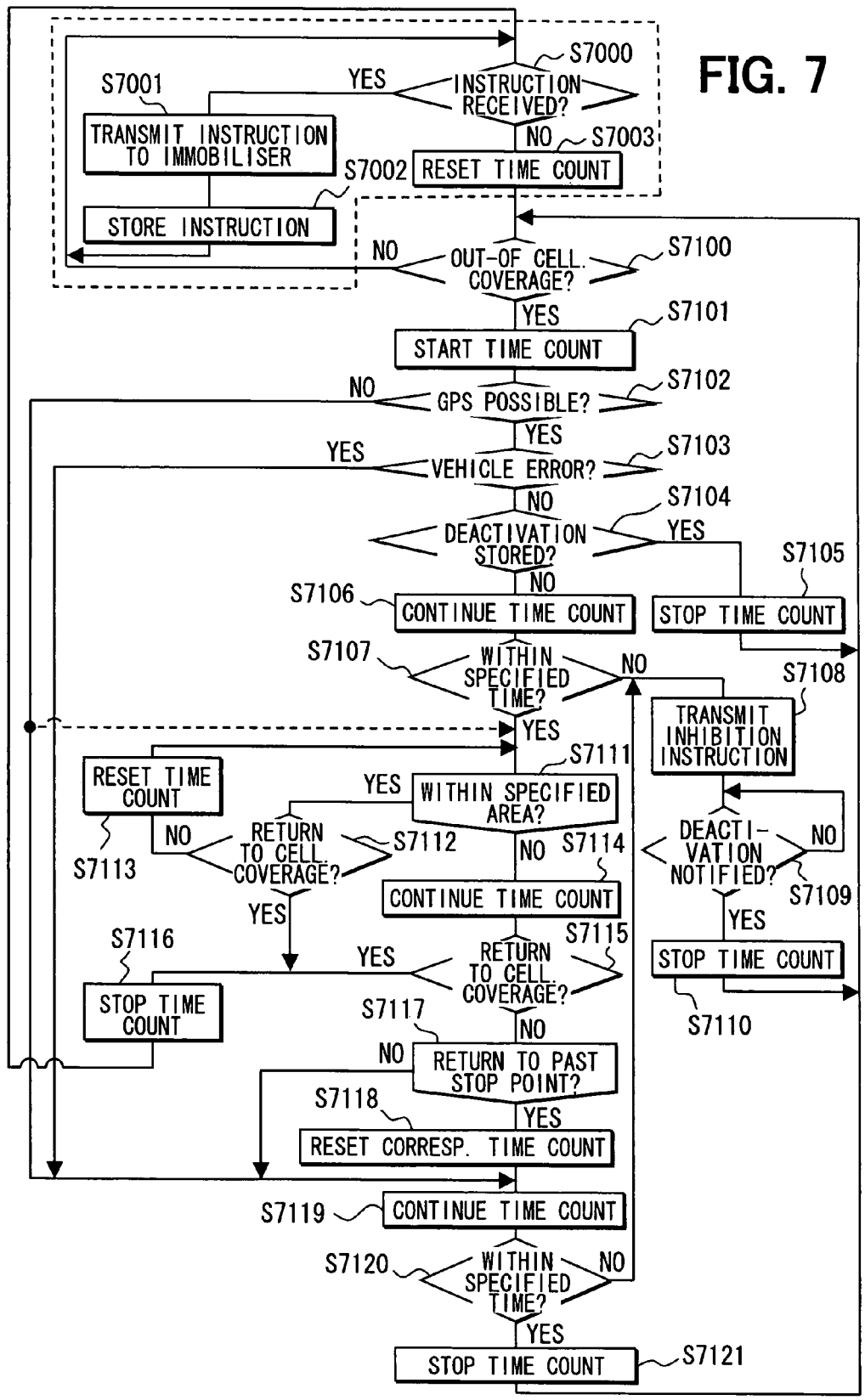
FIG. 7 is a flowchart showing an operation of a control unit of the navigation apparatus according to the invention.

Referring now to a flowchart in FIG. 7, the following describes how the control unit 413 controls the immobiliser 210 according to the embodiment. The description of the operation assumes that the onboard security apparatus 110 maintains the out-of-cellular coverage state. However, an operation in the cellular coverage state (Steps S7000 through S7003 enclosed in a dotted line) affects the operation flow at Step S7101 for starting the time measurement. The following describes the operation at Step S7100 and later with a supplementary description about these preceding steps.

In the cellular coverage state, the navigation apparatus 200 periodically determines whether or not to receive a forcible operation instruction for forcibly operating the immobiliser 210 or a deactivation instruction for releasing the forcible operation from the base station 140 (Step S7000). When receiving the forcible operation instruction or deactivation instruction via the cellular communication unit 4110 (yes at Step S7000), the control unit 413 transmits the forcible operation instruction or deactivation instruction to the immobiliser 210 via the vehicle interface unit 412 (Step S7001) and updates, based on the received instruction, a last instruction storage area of the storage unit 404, which stores the most recently received instruction either the forcible operation instruction or the deactivation instruction (Step S7002). When not receiving the instruction (no at Step S7000), the control unit 413 proceeds to Step S7003.

At Step S7003, the control unit 413 stops the time measurement, resets the time count stored in the storage unit 404 to zero, and proceeds to Step S7100.

At Step S7100, the control unit 413 allows the cellular communication unit 410 to determine whether or not the onboard security apparatus 110 is out of cellular coverage. In more detail, the cellular communication unit 410 has a cellular communication determining unit or means (not shown) for determining whether the onboard security apparatus 110 is in or out of cellular coverage. The cellular communication determining unit measures an electric field strength of the radio wave transmitted from the base station 140. When the electric field strength is greater than or equal to a specified strength (no at Step S7100), the cellular communication determining unit determines that the onboard security apparatus 110 is in the cellular coverage. The cellular communication determining unit transmits a signal notifying this state to the control unit 413. The control unit 413 receives this signal and advances the operation to Step S7000. When the electric field strength is smaller than the specified strength (yes at Step S7100), the cellular communication determining unit determines that the onboard security apparatus 110 is out of the cellular coverage. The cellular communication determining unit transmits a signal notifying this state to the control unit 413. The control unit 413 receives this signal and advances the operation to Step S7101.

The flowchart starts the operation when the determination at Step S7100 yields the affirmative result (yes). The control unit 413 operates the built-in time measuring unit 414 to start measuring the time. The control unit 413 allows the storage unit 404 to sequentially store time counts accumulated by the time measurement (Step S7101).

At Step S7102, the control unit 413 determines whether or not the onboard security apparatus 110 can receive a radio wave from a GPS satellite using the GPS receiver 403. Generally, the GPS acquires reliable position information by receiving the radio wave from at least three satellites. The control unit 413 determines the GPS reception to be impossible when the GPS receiver 403 can only receive the radio wave from up to two satellites (no at Step S7102). The control unit 413 continues the time measurement and stores the time count (Step S7119).

The control unit 413 measures the latitude and longitude of the current position when the GPS receiver 403 can receive the radio wave at least three satellites (yes at Step S7102). The control unit 413 allows the storage unit 404 to store the measured position information and proceeds to Step S7103.

At Step S7103, the control unit 413 inspects the vehicle for an error. When receiving a signal indicating error detection from the vehicle state detection unit 220 (yes at Step S7103), the control unit 413 proceeds to Step S7119 for continuing the time measurement and the time count. When not receiving the signal (no at Step S7103), the control unit 413 proceeds to Step S7104.

At Step S7104, it is determined whether or not the user requests the control unit 413 to stop the time measurement when the vehicle stays in the cellular coverage. The user may use a car ferry and intentionally leave the vehicle long in the out-of-cellular coverage area. The control unit 413 continues the time measurement and the time count and forcibly operates the immobiliser 210. Step S7104 aims to prevent the forcible operation from occurring in such case. The user cannon manually issue the request to the onboard security apparatus 110. The user needs to use the mobile phone 120 to transmit the request to the onboard security apparatus 110 for execution via the remote service center 130 and the base station 140 while the vehicle stays in the cellular covarage. When the request is not issued (no at Step S7104), the control unit 413 proceeds to Step S7106 for continuing the time measurement. When the request is issued (yes at Step S7104), the control unit 413 stops measuring the time by means of the time measuring unit 414 and storing the time count by means of the storage unit 404 (Step S7105) and returns to Step S7100. Here, since at this time, the vehicle is in the out-of-cellular coverage area, this determination is affirmed when the most recently received instruction stored in the last instruction storage area of the storage unit 404 at S7002 is the deactivation instruction.

At Step S7107, the control unit 413 determines whether or not the time count stored in the storage unit 404 is smaller than or equal to a specified value. When the time count is smaller than or equal to the specified value (yes at Step S7107), the control unit 413 does not transmit the forcible operation instruction to the immobiliser 210 and proceeds to Step S7111. When the time count exceeds the specified value (no at Step S7107), the control unit 413 proceeds to Step S7108. The control unit 413 transmits the forcible operation instruction to the immobiliser 210 from the vehicle interface unit 412 via the onboard LAN. When receiving a deactivation notification from the immobiliser 210 (yes at Step S7109), the control unit 413 stops measuring the time by means of the time measuring unit 414 and storing the time count by means of the storage unit 404 (Step S7110) and returns to Step S7100.

The specified value is equivalent to several days to weeks.

Figure 8:
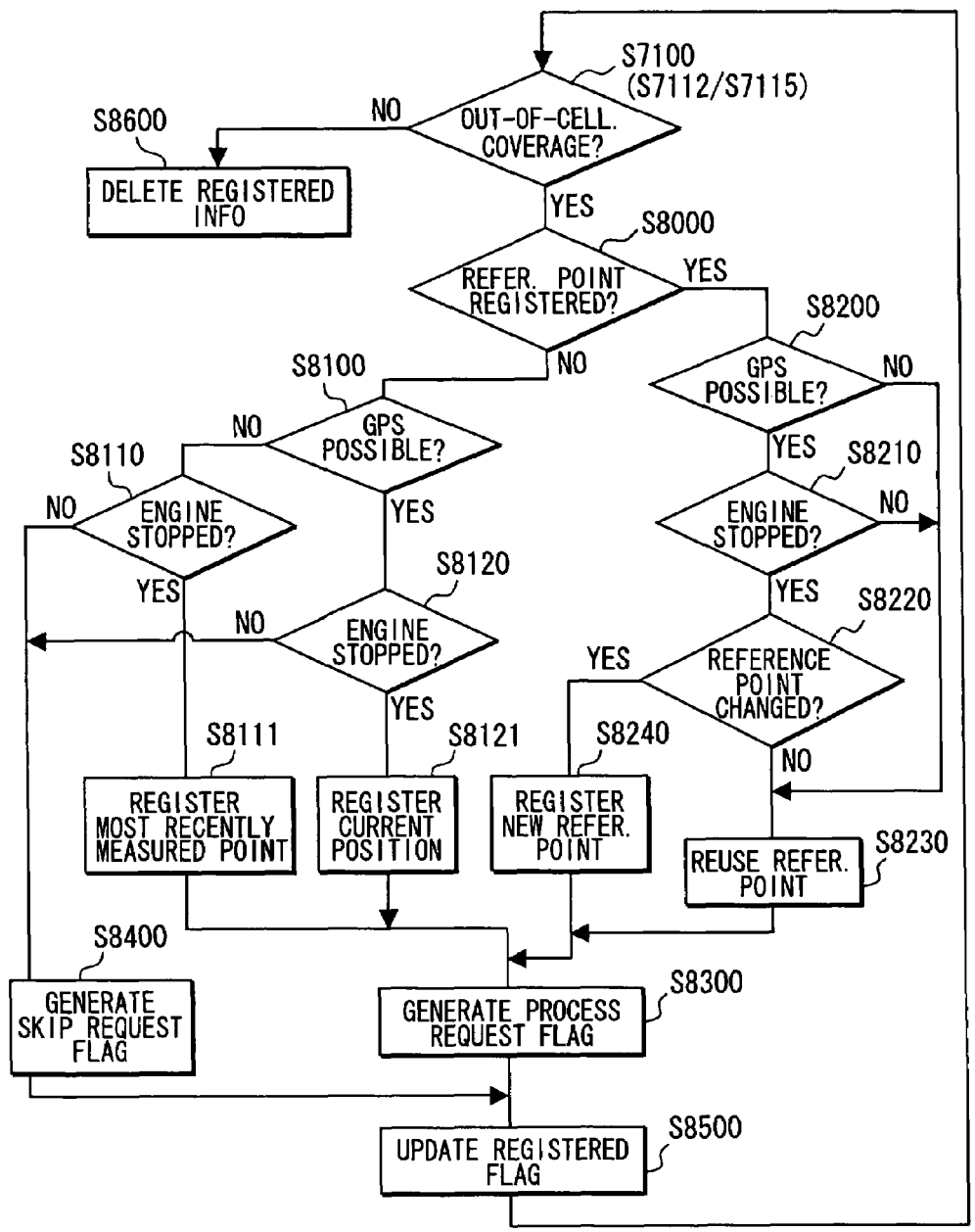
FIG. 8 is a flowchart showing an operation of the control unit according to a first embodiment of the invention.
Figure 9:
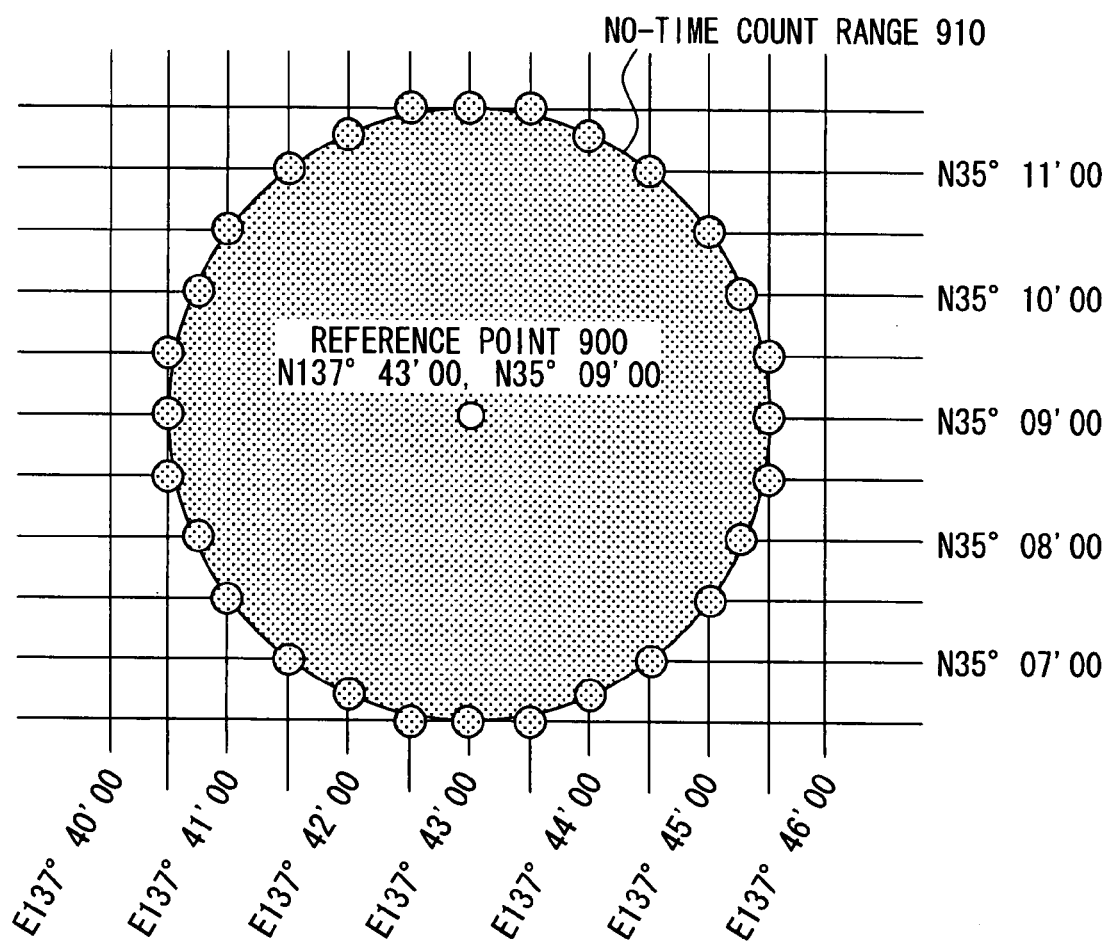
FIG. 9 schematically shows an operation of the security system operating outside a cellular coverage.

At Step S7111, the control unit 413 determines whether or not the vehicle is located in a specified area from a given reference point. Referring now to FIGS. 8 and 9, the following describes reference point setting and the specified area.

FIG. 8 is a flowchart showing an operation of the control unit 413 for setting the reference point. The process shown in this flowchart also generates various guides (hereafter referred to as flags) in the program for the determination at Step S7111. At Step S7111, the control unit 413 reads the reference point and the flag settled in this process and performs the determination based on them. This process is independent of that represented by the flowchart in FIG. 7. Both processes are performed parallel to each other.

FIG. 9 schematically shows an example of the specified area at Step S7111.

Step S8000 (start operation) in FIG. 8 assumes that the determination at Step S7100 in FIG. 7 yields the affirmative result (yes). At Step S8000, the control unit 413 determines whether or not the storage unit 404 stores (registers) position information at the reference point. When the reference point is not registered (no at Step S8000), the control unit 413 proceeds to Step S8100 and determines whether or not the GPS is capable of reception. When the reference point is registered (yes at Step S8000), the control unit 413 proceeds to Step S8200 and also determines whether or not the GPS is capable of reception.

When it is determined at Step S8100 that the GPS is incapable of reception (no at Step S8100), the control unit 413 proceeds to Step S8110 and determines whether or not the engine stops. Specifically, the control unit 413 determines whether or not it receives a signal indicating the engine stop from the immobiliser 210 via the onboard LAN. When it is determined that engine stops (yes at Step S8110), the control unit 413 proceeds to Step S8111 and registers a point most recently measured by the GPS as the reference point. The point most recently measured by the GPS corresponds to the point measured at Step S7102. The control unit 413 generates a process request flag (Step S8300) and updates the flag registered in the storage unit 404 (Step S8500). When the control unit 413 reads the process request flag at Step S7111, the process at Step S7111 is performed. When it is determined that the engine is operating (no at Step S8110), the control unit 413 generates a skip request flag (Step S8400) and registers it to the storage unit 404 (Step S8500). When the control unit 413 reads the skip request flag at Step S7111, the process at Step S7111 is not performed. The operation skips to Step S7114.

When it is determined at Step S8100 that the GPS is capable of reception (yes at Step S8100), the control unit 413 proceeds to Step S8120. At Step S8120, the control unit 413 determines whether or not the engine stops. When it is determined that the engine stops (yes at Step S8120), the control unit 413 allows the GPS to measure the vehicle's current position. The control unit 413 stores the acquired latitude and longitude in the storage unit 404 and proceeds to Step S8121. The control unit 413 automatically registers the stored current position as the reference point. The control unit 413 generates the process request flag (Step S8300) and updates the flag registered in the storage unit (Step S8500). When it is determined that the engine is operating (no at Step S8120), the control unit 413 generates a skip request flag (Step S8400) and registers it to the storage unit (Step S8500).

When it is determined at Step S8200 that the GPS is incapable of reception (no at Step S8200), the control unit 413 proceeds to Step S8230 and reuses the previously registered reference point. The control unit 413 generates a process request flag (Step S8300) and updates the flag registered in the storage unit (Step S8500).

When it is determined at Step S8200 that the GPS is capable of reception (yes at Step S8200), the control unit 413 proceeds to Step S8210 and determines whether or not the engine stops. When it is determined that the engine is operating (no at Step S8210), the control unit 413 proceeds to Step S8230. When it is determined that the engine stops (yes at Step S8210), the control unit 413 proceeds to Step S8220.

At Step S8220, the control unit 413 inquires the user whether or not to change the reference point. The control unit 413 allows the display unit 408 to display and audibly notifies whether or not to change the reference point to the current position. When the user changes the reference point using the operation switch group 407 or the audio input/output apparatus 409 (yes at Step S8220), the control unit 413 updates the reference point information stored in the storage unit 404. The control unit 413 registers the current position measured by the GPS as the new reference point (Step S8240). Changing the reference point requires an authentication operation such as password input that is permitted only for the qualified user. The control unit 413 generates the process request flag (Step S8300) and updates the flag registered in the storage unit 404 (Step S8500). When the reference point is not changed (no at Step S8220), the control unit 413 does not change the previously registered reference point. The control unit 413 further allows the GPS to measure the current position and stores it in the storage unit 404 (Step S8230). The control unit 413 generates the process request flag (Step S8300) and updates the flag registered in the storage unit 404 (Step S8500).

Step S8100 and later are needed for settling the reference point when the onboard security apparatus 110 first moves from the cellular coverage area to the out-of-cellular coverage area. Step S8200 and later are needed for settling the reference point when the engine is repeatedly stopped in the out-of-cellular coverage area.

The control unit 413 deletes the information about the reference point and the flag registered in the storage unit 404 (Step S8600) when it is determined at Step S7100, S7112, or S7115 that the onboard security apparatus 110 returns to the cellular coverage.

At Step S7111 in FIG. 7, the control unit 413 reads the reference point and the flag as settled above from the storage unit 404. When reading the skip request flag, the control unit 413 skips the operation to Step S7114. When reading the process request flag, the control unit 413 settles the specified area based on the registered reference point. The control unit 413 determines whether or not the vehicle's current position exists in the specified area. The following describes the operation when the process request flag is read. As exemplified in FIG. 9, the description below assumes that the specified area is most preferably a circle around the reference point.

In FIG. 9, for example, a reference point 900 is settled at longitude 137 degrees 43 minutes zero seconds east and latitude 35 degrees nine minutes zero seconds north. The control unit 413 settles a circle with radius 5 Km (no-time count range 910) around the reference point 900. At Step S7111, the control unit 413 determines whether or not the vehicle's current position exists in the no-time count range 910. The method is to calculate a distance difference between the reference point 900 and the vehicle's current position according to the following equation. The storage unit 404 stores the position information about the stopped vehicle as the reference point 900. The GPS receiver 403 detects the current position information. The control unit 413 determines whether or not the distance difference is smaller than or equal to five kilometers.

Distance difference=(|(latitude of the reference point 900 stored in the storage unit 404)−(latitude of the position where the vehicle stops currently)|$^2$+ |(longitude of the reference point 900 stored in the storage unit 404)−(longitude of the position where the vehicle stops currently)|$^2$)$^{1/2}$ One second is assumed be equivalent to approximately 30 m. When the distance difference is smaller than or equal to approximately two minutes 45 seconds, the control unit 413 assumes that Step S7111 yields an affirmative result (yes). The control unit 413 deletes the position information other than the reference point stored in the storage unit 404 and proceeds to Step S7112.

At Step S7112, the control unit 413 uses the cellular communication unit 410 to determine whether or not the onboard security apparatus 110 returns to the cellular coverage. When it is determined that the onboard security apparatus 110 returns to the cellular coverage (yes at Step S7112), the control unit 413 deletes the position information about the reference point stored in the storage unit 404. The control unit 413 proceeds to Step S7116, stops measuring the time by means of the time measuring unit 414 and storing the time count by means of storage unit 404, and then returns to Step S7000. When it is determined that onboard security apparatus 110 remains out of the cellular coverage (no at Step S7112), the control unit 413 proceeds to Step S7113, continues the time measurement, and resets the time count stored in the storage unit 404 to zero.

The onboard security apparatus 110 may move to an out-of-cellular coverage area and may keep the out-of-cellular coverage state for a long time. While the onboard security apparatus 110 stays in the specified area from the reference point, the control unit 413 does not perform the time count that forcibly operates the immobiliser 210. This effect can help decrease occurrences of the following situation. For example, the qualified user's activities may contain an out-of-cellular coverage area. Even though the qualified user uses his or her vehicle, the time count takes place in the out-of-cellular coverage area and exceeds a threshold value in the long run to forcibly operate the immobiliser 210. The user needs to release the forcible operation by entering a password, for example.

When the distance difference exceeds approximately two minutes 45 seconds, the control unit 413 determines that the vehicle moves over the specified area (no at Step S7111). The control unit 413 continues measuring the time by means of the time measuring unit 414 and storing the time count by means of storage unit 404 (Step S7114) and proceeds to Step S7115.

At Step S7115, the control unit 413 allows the cellular communication unit 410 to determine whether or not the vehicle returns to the cellular coverage. When it is determined that the vehicle returns to the cellular coverage (yes at Step S7115), the control unit 413 deletes the position information stored in the storage unit 404. The control unit 413 proceeds to Step S7116 to stop measuring the time by means of the time measuring unit 414 and storing the time count by means of storage unit 404, and then returns to Step S7000. When it is determined that the vehicle remains out of the cellular coverage (no at Step S7115), the control unit 413 proceeds to Step S7117.

The following describes Steps S7117 and S7118. As mentioned above, these steps assume that the vehicle stays in the out-of-cellular coverage area and the reference point is not registered or the vehicle moves out of a specified area from the reference point. The steps store the position information about the stopped vehicle. Using the position information, the control unit 413 determines whether or not the vehicle returns from one stop position to another (Step S7117). When the vehicle returns to that position, the control unit 413 resets the time count for the return to zero (Step S7118).

Figure 10:
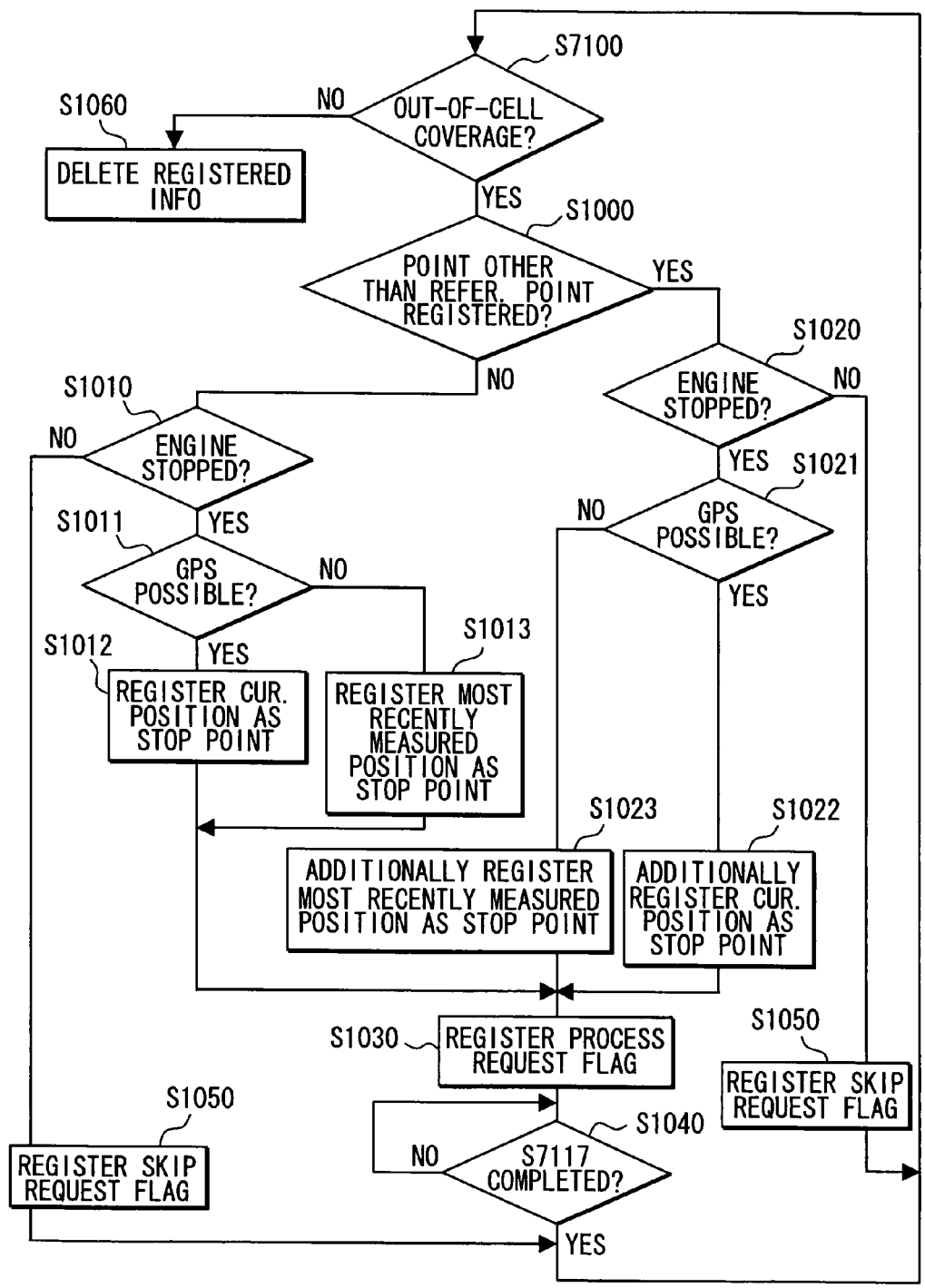
FIG. 10 is a flowchart showing an operation of the control unit according to the first embodiment of the invention.

The determination will be described in more detail with reference to FIG. 10. FIG. 10 is a flowchart showing the operation of the control unit 413 associated with the determination. The process represented by the flowchart registers the stop position information and generates a flag in the program for the determination at Step S7117. At Step S7117, the control unit 413 reads the flag and performs the determination based on the flag. This process differs from that represented by the flowchart in FIG. 7. Both processes are performed parallel to each other.

Step S1000 (start operation) in FIG. 10 assumes that the determination at Step S7100 in FIG. 7 yields the affirmative result (yes). At Step S1000, the control unit 413 determines whether or not the vehicle moves out of the no-time count range 910 and stops at a point out of the no-time count range 910 at Step S7111.

The method is to determine whether or not the storage unit 404 registers position information other than the reference point at Step S7111. When the storage unit 404 registers no position information other than the reference point (no at Step S1000), the control unit 413 proceeds to Step S1010 and determines whether or not the engine stops.

When it is determined at Step S1010 that the engine is operating (no at Step S1010), the vehicle moves out of the no-time count range 910 and never stops. The control unit 413 proceeds to Step S1050. At Step S1050, the control unit 413 generates the skip request flag and registers it to the storage unit 404. When reading the skip request flag at Step S7117, the control unit 413 skips the process at Step S7118 and proceeds to Step S7119. At Step S7119, the control unit 413 continues measuring the time and storing the time count. When it is determined at Step S1010 that the engine stops (yes at Step S1010), the control unit 413 proceeds to Step S1011 to determine whether or not the GPS is capable of reception. When the GPS is capable of reception (yes at Step S1011), the control unit 413 allows the storage unit 404 to store as a stop point the position information resulting from the current position measured by the GPS (Step S1012). The control unit 413 proceeds to Step S1030 to generate the process request flag and registers it to the storage unit 404. When reading the process request flag at Step S7117, the control unit 413 performs the process at Step S7117. When the GPS is incapable of reception (no at Step S1011), the control unit 413 registers the position information most recently measured by the GPS as a stop point (Step S1013). The control unit 413 proceeds to Step S1030 to generate the process request flag and registers it to the storage unit 404.

When the storage unit 404 stores position information other than the reference point (no at Step S1000), the control unit 413 proceeds to Step S1020 and determines whether or not the engine stops. When it is determined at Step S1020 that the engine is operating (no at Step S1020), the control unit 413 proceeds to Step S1050, generates the skip request flag, and registers it to the storage unit 404. When it is determined at Step S1020 that the engine stops (yes at Step S1020), the control unit 413 proceeds to Step S1021 and determines whether or not the GPS is capable of reception.

When the GPS is capable of reception (yes at Step S1021), the control unit 413 allows the GPS to measure the current position. The control unit 413 additionally registers the acquired current position information as a stop point (Step S1022) and proceeds to Step S1030.

When it is determined at Step S1021 that the GPS is incapable of reception (no at Step S1021), the control unit 413 proceeds to Step S1023. At Step S1023, the control unit 413 additionally registers the position information most recently measured by the GPS as a stop point and proceeds to Step S1030.

At Step S1040, the control unit 413 determines whether or not the determination at Step S7117 is complete. When the determination at Step S7117 is incomplete (no at Step S1040), the control unit 413 holds the process request flag registered at Step S1030. When the determination at Step S7117 is complete (yes at Step S1040), the control unit 413 returns to Step S7100.

When it is determined at Step S7100 that the vehicle returns to the cellular coverage (yes at Step S7100), the control unit 413 deletes the position information registered to the storage unit 404. The flag is reset (Step S1060).

At Step S7117 in FIG. 7, the control unit 413 reads the registered flag from the storage unit 404. When reading the skip request flag, the control unit 413 skips the process to Step S7119. When reading the process request flag, the control unit 413 performs the subsequent process.

The control unit 413 compares distance differences between the stop position information most recently registered to the storage unit 404 and all the other stop position information. When the distance difference is within a specified value such as 300 m (yes at Step S7117), the control unit 413 assumes that the vehicle returns to the past stop point. The control unit 413 proceeds to Step S7118 and resets to zero the corresponding time count from the earliest registered information to the most recently registered one out of the registered stop position information.

When the distance difference exceeds the specified value (no at Step S7117), the control unit 413 proceeds to Step S7119. At Step S7119, the control unit 413 continues measuring the time and storing the time count.

There have been described in detail the operations of Steps S7117 and S7118.

Steps S7117 and S7118 provide the following effects. The qualified user's activities may be contained in the out-of-cellular coverage area and the specified area. Nevertheless, the user may sometimes go to a distant place and exceptionally move the vehicle outside the specified range. In such case, stop points are sequentially registered to the storage unit 404. When the user stops the vehicle that returns to any of the registered stop points, the time count for the movement outside the specified range is reset to zero. This can decrease possibilities of forcibly operating the immobiliser 210 even though the qualified user uses the vehicle.

At Step S7120, the control unit 413 determines whether or not the time count accumulated at the above-mentioned steps is smaller than or equal to a specified value. When the time count is smaller than or equal to the specified value (yes at Step S7120), the control unit 413 proceeds to Step S7121 without transmitting the forcible operation instruction to the immobiliser 210. The control unit 413 stops measuring the time by means of the time measuring unit 414 and storing the time count by means of storage unit 404, and then returns to Step S7100. When the time count exceeds the specified value (no at Step S7120), the control unit 413 proceeds to Step S7108.

There have been described the operations of the control unit 413 according to the first embodiment.

There may be various modes of the embodiment. When the GPS is incapable of reception at Step S7102, the GPS reception may be attempted during a specified time period, for example. When the GPS is still incapable of reception after the specified time period, it may be determined that the GPS is incapable of reception.

The embodiment does not always need Steps S7117 and S7118. When the vehicle moves outside the specified range from the specified reference point, it may be preferable to unconditionally continue measuring the time and storing the time count while the out-of-cellular coverage state takes effect.

A hard disk apparatus may be used for the storage medium 405 of the navigation apparatus 200. In this case, a free area of the hard disk apparatus may be used for the storage unit 404.

According to the above-mentioned embodiment, the user interface unit 300 is described as part of the immobiliser 210. The operation switch group 407 and the display unit 408 of the navigation apparatus 200 may be used as the user interface unit 300. The control unit 413 of the navigation apparatus 200 may be used for password authentication. When determining that the authentication is successful, the control unit 413 transmits an instruction for releasing the forcible operation of the immobiliser 210 via the onboard LAN. The immobiliser 210 receives the instruction and releases the forcible operation. In this manner, the construction can be simpler.

Figure 11:
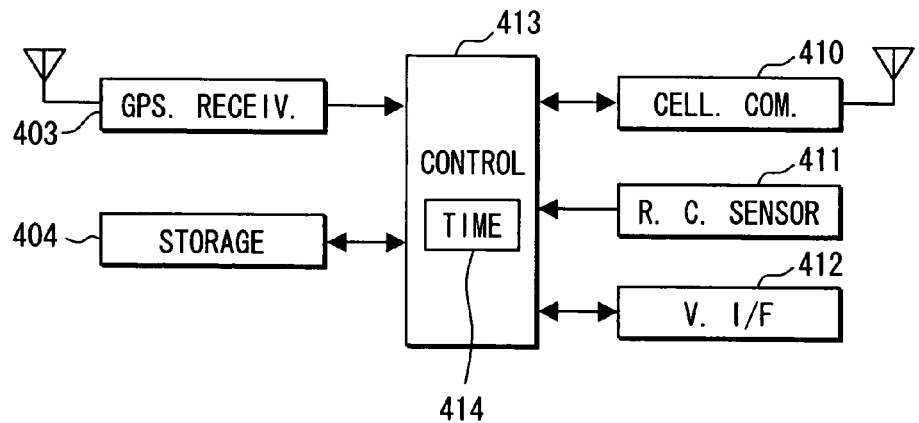
FIG. 11 is a block diagram partly showing the onboard security apparatus according to the first embodiment.

The embodiment uses the GPS receiver 403, i.e., part of the position detection function of the navigation apparatus 200, in place of the position detection unit 400 of the onboard security apparatus 110. Since the position detection is committed only to the GPS, the onboard security apparatus 110 may not include the position detection unit 400 having the vehicle speed sensor and the gyroscope 402. In this case, the portion equivalent to the navigation apparatus of the onboard security apparatus 110 includes: the GPS receiver 403, the cellular communication unit 410, the storage unit 404, the vehicle interface unit 412, and the control unit 413 for controlling these components. A block diagram in FIG. 11 shows this construction. The operations of the control unit 413 are the same as those represented by the flowchart in FIG. 7.

When the navigation apparatus 200 is not provided as mentioned above, the immobiliser control unit 305 may substitute the control unit 413. In this case, the immobiliser 210 includes the storage unit 404 (including ROM and RAM) for storing the position information and the time measuring information. The immobiliser control unit 305 contains the time measuring unit 414.

Second Embodiment

Though the first embodiment does not always need the navigation apparatus 200, its function may be used obviously. That is, the dead reckoning navigation may be used to measure vehicle positions. The dead reckoning navigation is a positioning method that calculates position information about a vehicle based on a vehicle speed detected by the vehicle speed sensor 401 and a vehicle movement detected by the gyroscope 402. This technique is very often used when the general navigation apparatus 200 detects positions.

The second embodiment differs from the first one in three points with reference to the operation flowchart for the control unit 413 in FIG. 7. Specifically, the differences are: the control flow following the dotted line when the determination at Step S7102 yields a negative result (no); the parallel process related to Step S7111; and the parallel process related to Step S7117. The second embodiment equals the first one in the other points.

The differences will be described below. When Step S7102 yields a negative result (no), the control unit 413 proceeds to Step S7111. This is because the dead reckoning navigation can be used for positioning.

Figure 12:
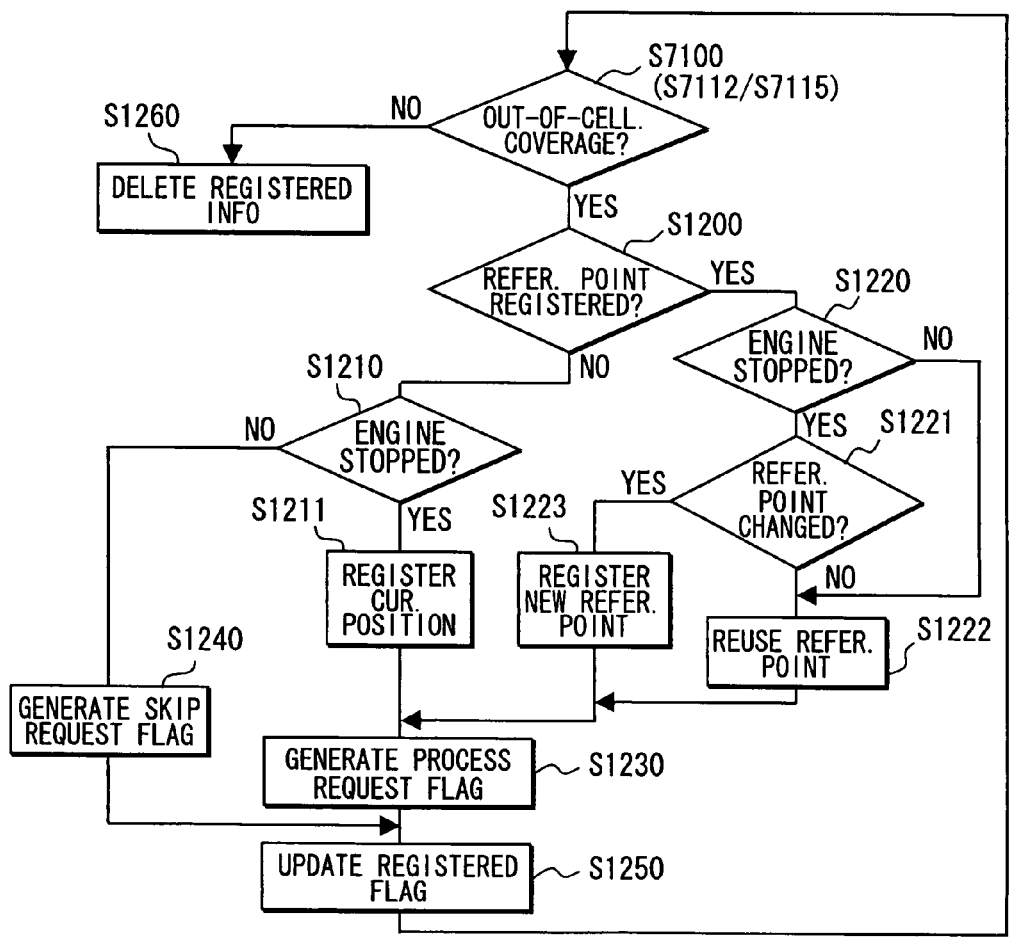
FIG. 12 is a flowchart showing an operation of the control unit of the navigation apparatus according to a second invention.

The following describes the operation at Step S7111 according to the embodiment with reference to a flowchart in FIG. 12.

Similarly to the first embodiment, the process in FIG. 12 is independent of that in FIG. 7. Both processes are performed parallel to each other.

Step S1 200 (start operation) in FIG. 12 assumes that the determination at Step S7100 in FIG. 7 yields the affirmative result (yes). At Step S1200, the control unit 413 determines whether or not the storage unit 404 stores (registers) position information at the reference point. When the reference point is not registered (no at Step S1200), the control unit 413 proceeds to Step S1210 and determines whether or not the engine stops. When the reference point is registered (yes at Step S1200), the control unit 413 proceeds to Step S1220 and also determines whether or not the engine stops.

When it is determined at Step S1210 that the engine stops (yes at Step S1210), the control unit 413 proceeds to Step S1211. The control unit 413 registers the current position information measured by the dead reckoning navigation and the GPS as a reference point. The control unit 413 generates the process request flag (Step S1230) and updates the flag registered in the storage unit 404 (Step S1250). When it is determined at Step S1.210 that the engine is operating (no at Step S1210), the control unit 413 generates the skip request flag (Step S1240) and registers it to the storage unit 404 (Step S1250).

When it is determined at Step S1220 that the engine is operating (no at Step S1220), the control unit 413 proceeds to Step S1222 and reuses the previously registered reference point. The control unit 413 generates the process request flag (Step S1230) and updates the flag registered in the storage unit 404 (Step S1250).

When it is determined at Step S1220 that the engine stops (yes at Step S1220), the control unit 413 proceeds to Step S1221.

At Step S1221, the control unit 413 inquires the user whether or not to change the reference point. The control unit 413 allows the display unit 408 to display and audibly notifies whether or not to change the reference point to the current position. When the user changes the reference point using the operation switch group 407 or the audio input/output apparatus 409 (yes at Step S1221), the control unit 413 updates the reference point information stored in the storage unit 404. The control unit 413 registers the current position measured by the dead reckoning navigation and the GPS as the new reference point (Step S1223). Changing the reference point requires an authentication operation such as password input. The control unit 413 generates the process request flag (Step S1230) and updates the flag registered in the storage unit 404 (Step S1250). When the reference point is not changed (no at Step S1221), the control unit 413 does not change the previously registered reference point. The control unit 413 further allows the GPS to measure the current position and stores it in the storage unit 404 (Step S1222). The control unit 413 generates the process request flag (Step S1230) and updates the flag registered in the storage unit 404 (Step S1250).

Step S1210 and later are needed for settling the reference point when the onboard security apparatus 110 first moves from the cellular coverage area to the out-of-cellular coverage area. Step S1220 and later are needed for settling the reference point when the engine is repeatedly stopped in the out-of-cellular coverage area.

The control unit 413 deletes the information about the reference point and the flag registered in the storage unit 404 (Step S1260) when it is determined at Step S7100, S7112, or S7115 that the onboard security apparatus 110 returns to the cellular coverage.

At Step S7111 in FIG. 7, the control unit 413 reads the reference point and the flag as settled above from the storage unit 404. The operation is the same as that described in the first embodiment.

Figure 13:
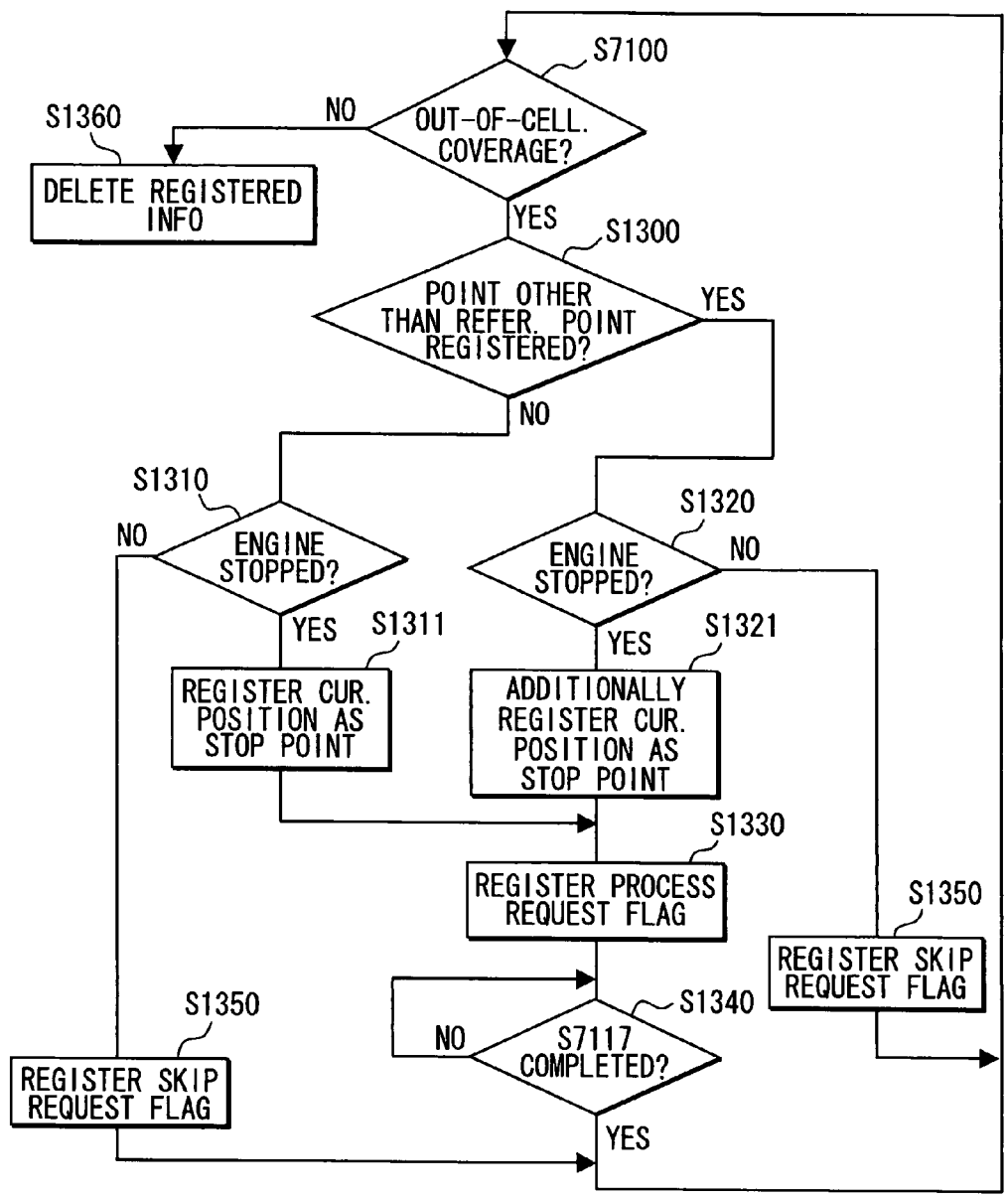
FIG. 13 is a flowchart showing an operation of the control unit of the navigation apparatus according to the second invention.

The following describes the operations at Steps S7117 and S7118 according to the embodiment with reference to a flowchart in FIG. 13.

The flowcharts in FIGS. 13 and 8 are based on the same assumption.

Step S1300 (start operation) in FIG. 13 assumes that the determination at Step S7100 in FIG. 7 yields the affirmative result (yes). At Step S1300, the control unit 413 determines whether or not the vehicle moves out of the no-time count range 910 and stops at a point out of the same at Step S7111.

The method is to determine whether or not the storage unit 404 registers position information other than the reference point at Step S7111. When the storage unit 404 registers no position information other than the reference point (no at Step S1300), the control unit 413 proceeds to Step S1310 and determines whether or not the engine stops.

When it is determined at Step SI 310 that the engine is operating (no at Step S1310), the vehicle moves out of the no-time count range 910 and never stops. The control unit 413 proceeds to Step S1350. At Step S1350, the control unit 413 generates the skip request flag and registers it to the storage unit 404. When it is determined at Step S1310 that the engine stops (yes at Step SI 310), the control unit 413 proceeds to Step S1 311 and registers as a stop point the position information to the storage unit 404. The dead reckoning navigation and the GPS measure the current position to generate the position information. The control unit 413 proceeds to Step S1330 to generate the process request flag and registers it to the storage unit 404.

When the storage unit 404 registers the position information other than the reference point (yes at Step SI 300), the control unit 413 proceeds to Step S1320 and determines whether or not the engine stops. When it is determined at Step S1 320 that the engine is operating (no at Step S1 320), the control unit 413 proceeds to Step S1050 to generate the skip request flag and registers it to the storage unit 404. When it is determined at Step S1320 that the engine stops (yes at Step S1320), the control unit 413 measures the current position using the dead reckoning navigation and/or the GPS. The control unit 413 additionally registers the acquired current position information as a stop point and proceeds to Step S1330.

At Step S1340, the control unit 413 determines whether or not the determination at Step S7117 is complete. When the determination at Step S7117 is incomplete (no at Step S1340), the control unit 413 holds the process request flag registered at Step S1330. When the determination at Step S7117 is complete (yes at Step S1340), the control unit 413 returns to Step S7100.

When it is determined at Step S7100 that the vehicle returns to the cellular coverage (yes at Step S7100), the control unit 413 deletes the position information registered to the storage unit 404. The flag is reset (Step S1360).

At Step S7117 in FIG. 7, the control unit 413 reads the registered flag from the storage unit 404. The operation is the same as that described in the first embodiment.

There have been described in detail the operations of Steps S7117 and S7118 according to the second embodiment.

When the GPS continues to be incapable of reception for a long time out of the cellular coverage, the dead reckoning navigation can prevent the situation where the immobiliser 210 forcibly operates even though the qualified user uses the vehicle.

There has been described the second embodiment.

<Modifications>

In the first and second embodiments, it is determined whether or not the vehicle exists in an out-of-cellular coverage area (e.g., at Step S7100). Actually, however, it is difficult for the cellular communication unit 410 to determine whether or not the vehicle is out of the cellular coverage. The vehicle may stay in an area that cannot be easily determined to be in or out of the cellular coverage. Reception conditions on the radio wave may momentarily change depending on climate conditions. In such case, a communication coverage area in a global sense may contain a locally out-of-cellular coverage area. When the control unit 413 measures the time, the time count may exceed a specified value and the immobiliser 210 may operate forcibly.

To solve this problem, it is preferable that data for the navigation apparatus 200 previously stores the information about the out-of-cellular coverage area. There may be a case where the cellular communication unit 410 detects an out-of-cellular coverage state even though the map data for the vehicle's current position is not out of cellular coverage. As mentioned above, the case may result from a climatic phenomenon that interrupts the communication. The control unit 413 preferably stops measuring the time and storing the time count.

The control unit 413 settles an out-of-cellular coverage area and measures the time based on the map data, not on a radio wave reception state detected by the cellular communication unit 410. This makes it possible to prevent the immobiliser 210 from malfunctioning. The immobiliser 210 may otherwise malfunction when the cellular communication unit 410 causes a determination error and the control unit 413 accordingly measures the time incorrectly assuming that a vehicle, actually in a cellular coverage state, stays out of cellular coverage.

The cellular communication unit 410 may be destroyed or remodeled. In such case, the vehicle state detection unit 220 can detect the destruction or remodeling. A simpler solution is to temporarily stop the time measurement. After a specified lapse of time, there may be a difference between the cellular coverage information contained in the map data and the similar information determined by the cellular communication unit 410. In this case, it may be preferable to restart the temporarily stopped time measurement.

There have been described the embodiments.

The above-mentioned embodiments assume that the key 211 owned by the user need not be inserted into the key hole for the engine and automatically provides the ID code authentication when the vehicle enters a communication area for the onboard security apparatus 110. The invention is not limited thereto. Obviously, the key 211 may be shaped to an inside structure of the key hole and may not start the ID code authentication until inserted into the key hole. In this case, the vehicle cannot be stolen without the key after the engine starts. It is possible to eliminate the periodical collation and monitoring between the immobiliser 210 and the key 211 as described in the first embodiment.

While the embodiments assume the vehicle whose driving source is an internal combustion engine, the invention can be obviously applied to a vehicle whose driving source is an electric motor or both the engine and the electric motor.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A security system for a vehicle, the system comprising:
a security apparatus provided in the vehicle and including
    a) a position detection unit for detecting a current position of the vehicle,
    b) a start inhibition unit for inhibiting a specified start of a driving source of the vehicle, the specified start being based on a specified operation for starting the driving source,
    c) a communication unit for wireless communication with a base station,
    d) a time measuring unit for measuring a communication-disabled time period, for which the wireless communication is disabled, and
    e) a control unit for controlling the start inhibition unit; and
a mobile phone for issuing an inhibition instruction for the security apparatus via the base station, wherein the control unit causes the start inhibition unit to inhibit the specified start of the driving source (i) when the inhibition instruction is received by the communication unit or (ii) when the inhibition instruction is not received and the measured communication-disabled time period becomes longer than a specified time period,
wherein the control unit causes the start inhibition unit not to inhibit the specified start when (i) a stop point, where the vehicle stops, is where the wireless communication is disabled and (ii) a current position detected by the position detection unit exists within a specified distance from the stop point.

2. The security system of claim 1,
wherein when (i) the stop point, where the vehicle stops, is where the wireless communication is disabled and (ii) the current position detected by the position detection unit exists within a specified distance from the stop point, the time measuring unit stops measuring the communication-disabled time period.

3. The security system of claim 1,
wherein the specified operation for starting the driving source signifies a start operation using a user-owned start key that is configured to provide short-range wireless communication with the security apparatus.

4. The security system of claim 1,
wherein a user of the vehicle is allowed to determine the stop point, where the vehicle stops, by performing an authentication operation only known to the user.

5. The security system of claim 1,
wherein the communication unit further includes:
    a field strength detection unit for detecting an electric field strength of a radio wave for the wireless communication with the base station; and
    a communication state determining unit for determining availability of the wireless communication based on the detected electric field strength,
wherein the wireless communication is assumed to be unavailable when the communication state determining unit determines that the detected electric field strength is smaller than a specified strength.

6. The security system of claim 1,
wherein the mobile phone issues a release instruction for the security apparatus via the base station, the release instruction releasing a start inhibition state of the driving source, wherein in the start inhibition state the driving source is inhibited from starting by the start inhibition unit.

7. The security system of claim 1,
wherein a start inhibition state, where the driving source is inhibited from starting by the start inhibition unit, is released when a user of the vehicle provides to the security apparatus, an authentication operation only known to the user.

8. An onboard security apparatus provided in a vehicle and cooperative with a mobile phone via a base station, the apparatus comprising:
    a) a position detection unit for detecting a current position of the vehicle;
    b) a start inhibition unit for inhibiting a specified start of a driving source of the vehicle, the specified start being based on a specified operation for starting the driving source;
    c) a communication unit for wireless communication with a base station to received an instruction;
    d) a time measuring unit for measuring a communication-disabled time period, for which the wireless communication is disabled; and
    e) a control unit for controlling the start inhibition unit, wherein the mobile phone is configured to issue an inhibition instruction for the security apparatus via the base station, wherein the control unit causes the start inhibition unit to inhibit the specified start of the driving source (i) when the inhibition instruction is received by the communication unit or (ii) when the inhibition instruction is not received and the measured communication-disabled time period becomes longer than a specified time period, and wherein the control unit causes the start inhibition unit not to inhibit the specified start when (i) S stop point, where the vehicle stops, is where the wireless communication is disabled and (ii) a current position detected by the position detection unit exists within a specified distance from the stop point.

9. The onboard security apparatus of claim 8, wherein when (i) the stop point, where the vehicle stops, is where the wireless communication is disabled and (ii) the current position detected by the position detection unit exists within a specified distance from the stop point, the time measuring unit stops measuring the communication-disabled time period.

10. The onboard security apparatus of claim 8, wherein the specified operation for starting the driving source signifies a start operation using a user-owned start key communicable though short-range wireless communication.

11. The onboard security apparatus of claim 8, wherein a user of the vehicle is allowed to determine the stop point, where the vehicle stops, by performing an authentication operation only known to the user.

12. The onboard security apparatus of claim 8, wherein the communication unit further includes:
a field strength detection unit for detecting an electric field strength of a radio wave for the wireless communication with the base station; and
a communication state determining unit for determining availability of the wireless communication based on the detected electric field strength, wherein the wireless communication is assumed to he unavailable when the communication state determining unit determines that the detected electric field strength is smaller than a specified strength.

13. The onboard security apparatus of claim 8, wherein the mobile phone is configured to issue a release instruction for the security apparatus via the base station, the release instruction releasing a start inhibition state of the driving source, wherein in the start inhibition state the driving source is inhibited from starting by the start inhibition unit.

14. The onboard security apparatus of claim 8, wherein a start inhibition state, where the driving source is inhibited from starting by the start inhibition unit, is released when a user of the vehicle provides an authentication operation only known to the user.

15. The security system of claim 1, further comprising:
a remote service center configured to communicate with each of (i) the mobile phone and (ii) the communication unit of the security apparatus via the base station, the center providing a remote service for remotely operating the security apparatus based on an instruction issued by the mobile phone.

* * * * *